US009586514B2

United States Patent
Asao et al.

(10) Patent No.: US 9,586,514 B2
(45) Date of Patent: Mar. 7, 2017

(54) VEHICLE WITH LOAD-CARRYING PLATFORM

(71) Applicant: HONDA MOTOR CO., LTD., Minato-ku, Tokyo (JP)

(72) Inventors: Kosuke Asao, Tokyo (JP); Takeshi Kobayashi, Utsunomiya (JP); Hiroyuki Nishimori, Wako (JP); Makoto Hotozuka, Kawagoe (JP); Yuji Maki, Tomioka (JP); Takeyuki Kariyasu, Tokyo (JP); Hiroyuki Shinmura, Saitama (JP); Masanori Aoki, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/076,117

(22) Filed: Mar. 21, 2016

(65) Prior Publication Data
US 2016/0280122 A1    Sep. 29, 2016

(30) Foreign Application Priority Data

Mar. 23, 2015  (JP) .................................. 2015-059426

(51) Int. Cl.
*B60P 3/40* (2006.01)
*B60P 1/64* (2006.01)

(52) U.S. Cl.
CPC .. *B60P 3/40* (2013.01); *B60P 1/64* (2013.01)

(58) Field of Classification Search
CPC .... B60P 3/40; B60P 1/003; B60P 1/64; B60P 1/6409; B60P 1/6418; B62D 33/023; B62D 33/033

USPC ................................................... 296/50, 57.1
See application file for complete search history.

(56) References Cited

U.S. PATENT DOCUMENTS

| | | | | |
|---|---|---|---|---|
| 5,820,188 A * | 10/1998 | Nash | .................. | B62D 33/0273 296/26.11 |
| 5,857,724 A * | 1/1999 | Jarman | ................ | B62D 33/037 296/26.11 |
| 6,402,215 B1 * | 6/2002 | Leitner | ..................... | B60P 3/40 296/26.11 |
| 6,425,618 B1 * | 7/2002 | Garland | .................... | B60P 3/40 224/405 |
| 6,435,588 B1 * | 8/2002 | Bauer | ..................... | B60P 1/435 296/55 |
| 6,513,688 B2 * | 2/2003 | Kmita | ..................... | B60R 5/041 224/403 |
| 6,513,850 B1 * | 2/2003 | Reed | .................. | B62D 33/0273 296/26.08 |
| 6,719,345 B2 * | 4/2004 | Ootsuka | .................... | B60P 3/40 296/26.08 |
| 7,040,683 B1 * | 5/2006 | Beach | ................ | B62D 33/0273 296/57.1 |

(Continued)

*Primary Examiner* — Gregory Blankenship
(74) *Attorney, Agent, or Firm* — Honda Patents & Technologies North America, LLC; Adam G. Pugh

(57) ABSTRACT

In a vehicle with a load-carrying platform, an elastic band is provided so a rear portion of a tailgate and a rear portion of a bed extender enter a tensioned state. A rotation regulation mechanism is provided to the tailgate and the bed extender that regulates further rotational movement by the tailgate and the bed extender making contact when the tailgate is rotated towards a closed position. The bed extender and the tailgate are prevented from rotating in the same direction by the rotation regulation mechanism, and the load on the elastic band is mitigated.

20 Claims, 8 Drawing Sheets

(56) References Cited

U.S. PATENT DOCUMENTS

| | | | |
|---|---|---|---|
| 7,121,604 B2* | 10/2006 | Reed | B60P 3/40 |
| | | | 296/26.11 |
| 7,182,380 B2* | 2/2007 | Nagle | B62D 33/0273 |
| | | | 296/26.11 |
| 7,240,940 B2* | 7/2007 | Leitner | B62D 33/0273 |
| | | | 296/26.11 |
| 7,547,054 B2 | 6/2009 | Leitner | |
| 2016/0280122 A1* | 9/2016 | Asao | B60P 1/003 |

* cited by examiner

VEHICLE WITH LOAD-CARRYING PLATFORM

CROSS REFERENCES TO RELATED APPLICATIONS

The present application claims priority under 35 U.S.C. §119 to Japanese Patent Application No. 2015-059426, filed Mar. 23, 2015, entitled "Vehicle With Load-Carrying Platform," the contents of which are incorporated herein by reference in their entirety.

TECHNICAL FIELD

The present invention relates to a vehicle with a load-carrying platform that provides the load-carrying platform in a rear portion.

BACKGROUND ART

Among vehicles provided with a load-carrying platform in a rear portion, a vehicle is known that provides a load-carrying platform extension means referred to as a bed extender to the load-carrying platform in order to increase a carrying capacity of the load-carrying platform.

FIGS. 1 and 2 illustrate a known bed extender. As shown in FIG. 1, the vehicle is provided with the load-carrying platform in the rear portion, and this load-carrying platform is provided with a front-portion standing plate 123, one side-portion standing plate 125, another side-portion standing plate 127, a tailgate 137, and a bed extender 111. In FIG. 1, the bed extender 111 is placed in a stowed position.

From this state, the bed extender 111 is inversely moved 180° with a fulcrum portion 191 as a rotation center.

As a result, as illustrated in FIG. 2, the bed extender 111 rests on the tailgate 137 in an opened state. The bed extender 111 is fixed to the tailgate 137 by a lock mechanism 149.

Due to a difference in weight between the tailgate 137 and the bed extender 111, the tailgate 137 and the bed extender 111 exhibit different behaviors during travel. When the behaviors differ, a load on the lock mechanism increases. Increasing a rigidity of the lock mechanism 149 to handle the increase in the load invites enlargement and weight increasing of the lock mechanism 149.

In seeking weight reduction of the vehicle, a structure is sought that handles the difference in behaviors between the tailgate 137 and the bed extender 111 without inviting enlargement of the lock mechanism.

SUMMARY

The present invention has as a task to provide a vehicle with a load-carrying platform that can mitigate a load on an elastic band (corresponding to the conventional lock mechanism) that affixes a bed extender to a tailgate.

In one embodiment, a vehicle with a load-carrying platform includes a load-carrying platform that is provided in a vehicle rear portion and has a tailgate that can open and close; and a bed extender that has both ends axially supported by a side gate provided to the load-carrying platform, the bed extender being rotatable between a stowed state in contact with the load-carrying platform and an extended state in contact with the tailgate in an open position, the extended state effectively extending a load-carrying space in the vehicle rear portion to include the open tailgate. An elastic band is provided so a rear portion of the tailgate and a rear portion of the bed extender enter a tensioned state when the bed extender is in the extended state. A regulating cord is provided that regulates the elastic band from stretching beyond a predetermined distance. A rotation regulation mechanism is provided to the tailgate and the bed extender that regulates further rotational movement by the tailgate and the bed extender making contact when the tailgate closes.

In some aspects of embodiment, the rotation regulation mechanism can be made from a gate-side stopper member that is connected to the tailgate and has a front-facing stopper surface and an extender-side stopper member that is connected to the bed extender and has a rear-facing stopper surface. The bed extender can be connected to the tailgate and have a predetermined space opened between the front-facing stopper surface and the rear-facing stopper surface.

In further aspects, the gate-side stopper member can be integrally formed with a wire bracket that holds the tailgate in the open position.

In further aspects, the rotation regulation mechanism can include an elastic member that abuts either the front-facing stopper surface or the rear-facing stopper surface.

In still further aspects, the gate-side stopper member can be further integrally formed with an installation portion of the elastic band.

In still further aspects, the gate-side stopper member can be provided in correspondence to a diagonal surface formed in a corner portion between a rear surface of the bed extender and a side surface of the bed extender on the left or right. The gate-side stopper can be provided on an upper surface of the tailgate.

In other aspects, the extender-side stopper member can be provided on a rear surface of a member positioned downward when the bed extender is in its extended state.

In further aspects, the extender-side stopper member can be provided on a chamfered portion formed in a corner portion between a rear surface of the bed extender and a side surface of the bed extender on the left or right. The extender-side stopper member can include a plate bent in an L-shape.

In another embodiment, a bed extender system for a vehicle with a load-carrying platform can include an extender-side stopper member that is connected to the bed extender and has a rear-facing stopper surface, an elastic member, and a gate-side stopper member having a front-facing stopper surface. The gate-side stopper member can be configured to mount to a vehicle surface and abut the elastic member, the elastic member further abutting the extender-side stopper member to regulate rotation of the bed extender.

In further aspects, the gate-side stopper member can be further integrally formed with an installation portion for the elastic band.

In further aspects, the extender-side stopper member can be provided on a rear surface of a member positioned downward when the bed extender is in its extended state.

In further aspects, the extender-side stopper member can be provided on a chamfered portion formed in a corner portion between a rear surface of the bed extender and a side surface of the bed extender on the left or right.

In further aspects, the extender-side stopper member can include a plate bent in an L-shape.

In further aspects, the gate-side stopper member is integrally formed with a wire bracket for being connected to a tailgate configured to move between a closed position and an open position, and wherein the wire bracket is configured to hold the tailgate in the open position.

In still further aspects, the rotation regulation mechanism can be configured to regulate further rotational movement by the tailgate and the bed extender making contact when the tailgate closes.

In yet another embodiment, a rotation regulation mechanism for a bed extender of a vehicle with a load-carrying platform can include an extender-side stopper member with a rear-facing stopper surface, the extender-side stopper member configured for attachment to the bed extender; an elastic member; and a gate-side stopper member having a front-facing stopper surface, the gate-side stopper member configured for attachment to a tailgate of the vehicle and to abut the elastic member, the elastic member further abutting the extender-side stopper member to regulate motion of the stopper members, the bed extender and the tailgate.

In further aspects, the gate-side stopper member can be integrally formed with an installation portion configured to receive an elastic band.

In further aspects, the extender-side stopper member can include a plate bent in an L-shape.

Various advantages of embodiments of the invention may be realized. For example, where the bed extender is fixed to the tailgate by the elastic band, both can be continuously placed in the tensioned state to suppress generation of noise due to rattling. Independent movements of the bed extender relevant to the tailgate can be regulated by the regulating cord even with regard to excessive movement while optimizing a tension load. The bed extender and the tailgate can be prevented from rotating in the same direction by the rotation regulation mechanism.

In embodiments where the predetermined space is opened in a connected state, the weight of the bed extender is not applied to the gate-side stopper member. Because the gate-side stopper member does not have to bear the weight of the bed extender, its size can be significantly reduced.

In some embodiments, an impact force generated in conjunction with interference can be absorbed by the elastic member, greatly reducing noise.

In embodiments where the gate-side stopper member is integrally formed with the wire bracket, and optionally further integrally formed with the installation portion of the elastic band, different components share fixtures. By sharing fixtures, a component count can be reduced, costs can be reduced, and assembly properties can be improved.

In embodiments where the extender-side stopper member is provided on the rear surface below the fulcrum portion of the bed extender, the stopper member can efficiently regulate return rotation movement by the bed extender.

Embodiments with particular designs for the extender-size stopper member can simplify configuration, reduce costs, and eliminate projection.

Other benefits of the features described herein will be recognized by those of skill in the art.

BRIEF DESCRIPTION OF THE DRAWING(S)

DETAILED DESCRIPTION

Figure 1:
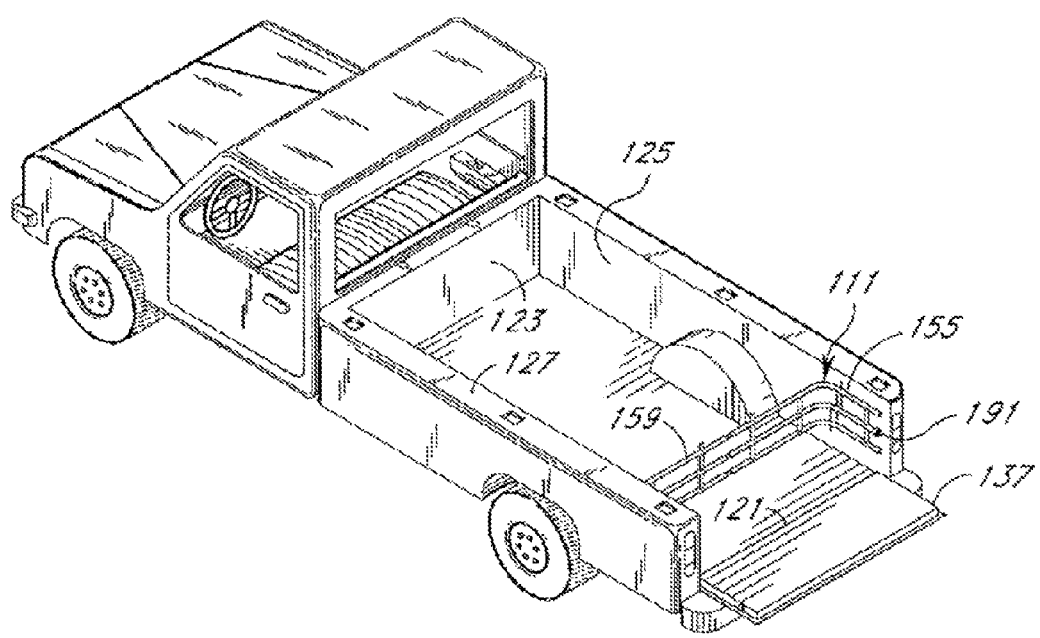
FIG. 1 illustrates a prior art bed extender in a stowed state.
Figure 2:
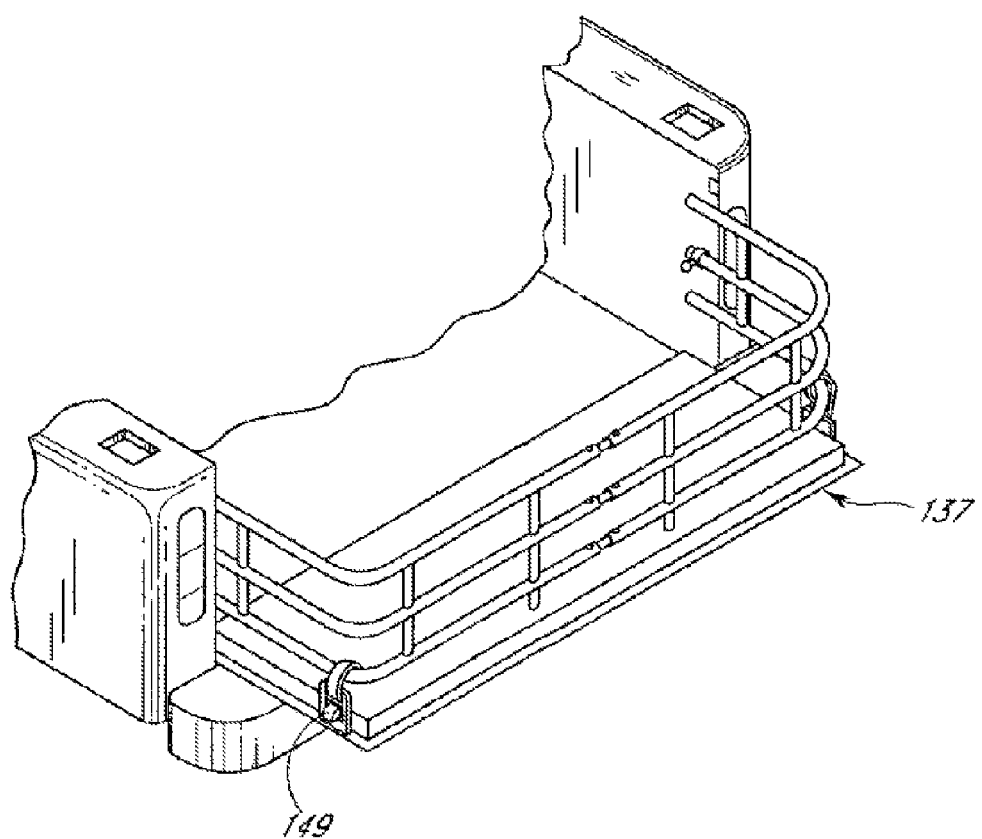
FIG. 2 illustrates the prior art bed extender in an extended state.
Figure 3:
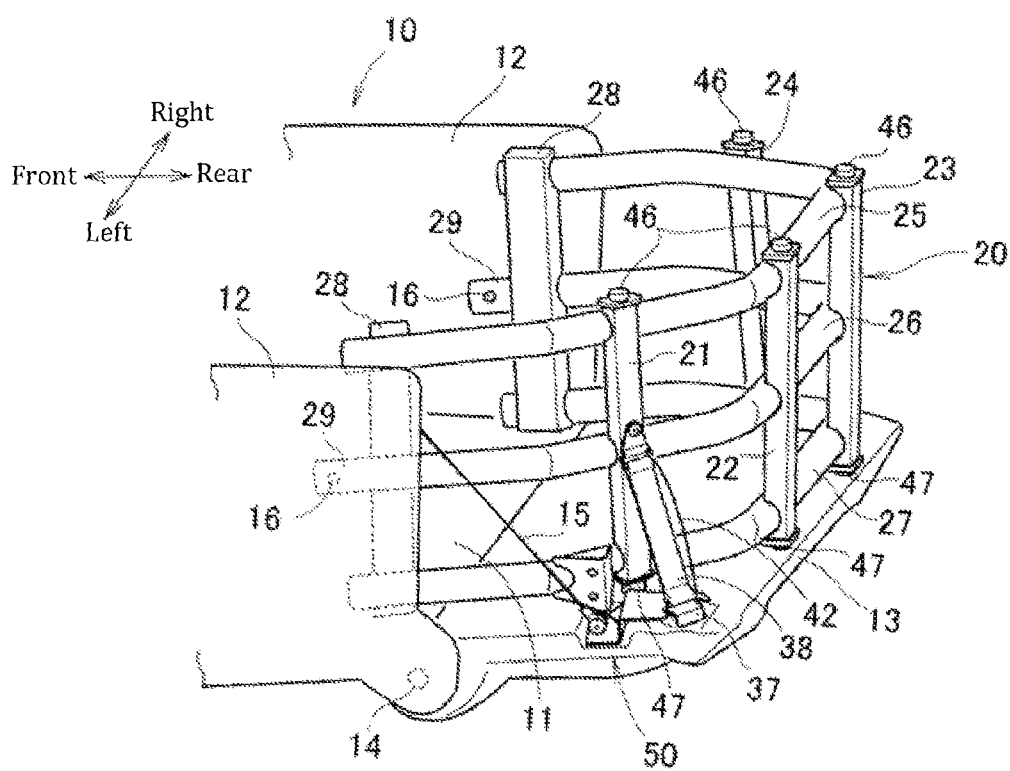
FIG. 3 is a perspective view of a rear portion of a vehicle with a load-carrying platform according to the present disclosure.

As illustrated in FIG. 3, a vehicle with a load-carrying platform 10 is provided with side gates 12, 12 on the left and right on a load-carrying platform 11 and a tailgate 13 of a rear portion of the vehicle, which may for example be a bed associated with a multi-utility vehicle (an "MUV") or a pickup truck. Although the illustrations herein are consistent with the vehicle being an MUV or a pickup truck having a bed, it will be understood that any vehicle having a load-carrying platform and tailgate as described herein may be consistent with the disclosure. The tailgate 13 is supported by the load-carrying platform 11 or lower portions of the side gates 12, 12 with a hinge pin 14 and is made to open from a standing position to a horizontal position. In the diagram, the tailgate 13 is opened to a horizontal position and suspended by a gate wire 15.

Additionally, a bed extender 20 is connected to a rear portion of the side gate 12. The bed extender 20 is axially supported by the side gates 12, 12 at fulcrum portions 16, 16.

The bed extender 20 in a stowed state resting on the load-carrying platform 11 comes to rest on the tailgate 13 by being inverted with the fulcrum portions 16, 16 as rotation centers. This position, illustrated in FIG. 3, represents the extended state for the bed extender 20. In the extended state, the total area available for placing items on the bed is increased to include the area of the tailgate 13, thus effectively extending the load-carrying platform 11.

While the bed extender 20 may be of any shape, an exemplary shape as illustrated in FIG. 3 is a fence whose main elements are four posts 21 to 24 and an upper pipe 25, a middle pipe 26, and a lower pipe 27 bridging the posts 21 to 24. The upper pipe 25, the middle pipe 26, and the lower pipe 27 have front end portions linked by linking plates 28, 28. Extending plates 29, 29 are extended from both ends of the middle pipe 26 and these extending plates 29, 29 are linked to the side gates 12, 12 at the fulcrum portions 16, 16.

A vibration-dampening cap 46 can be installed at one end of the posts 21 to 24. The cap 46 may be made of an elastic substance such as soft plastic or rubber in order to act to dampen the vibrations at the interface between the load-carrying platform 11 and the posts 21 to 24 when the bed extender 20 is stowed. Similarly, another vibration-dampening end cap 47 can be installed on the other end of the posts 21 to 24 that abuts an upper surface of the tailgate 13 when the bed extender 20 is in the extended state.

Figure 4:
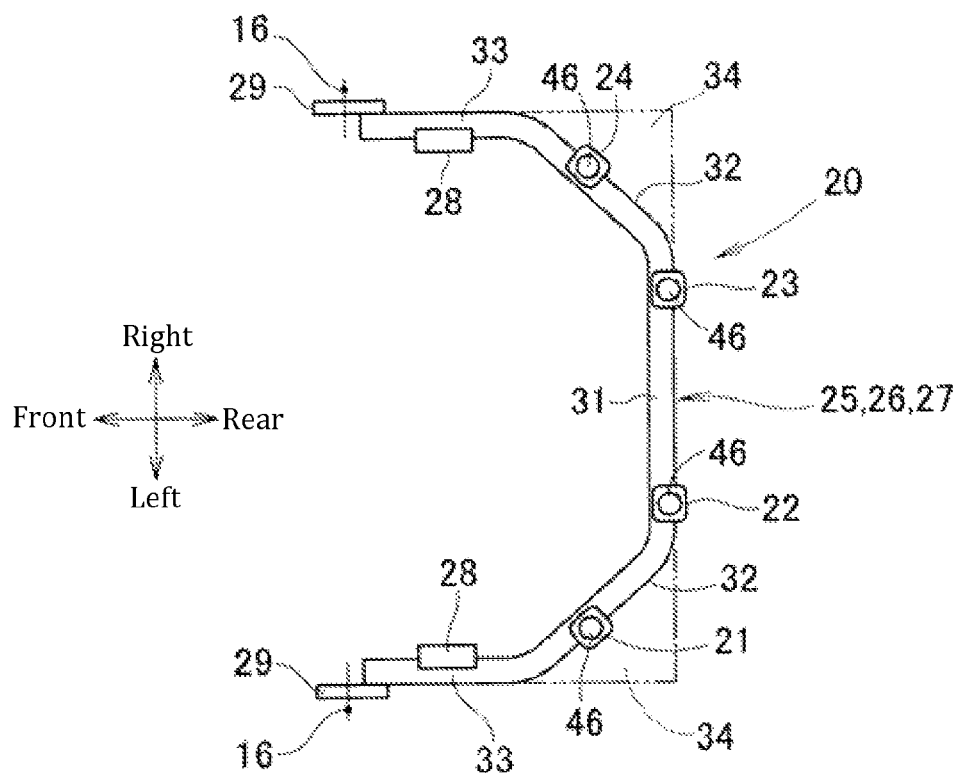
FIG. 4 is a plan view of a bed extender.

As illustrated in FIG. 4, the four posts 21 to 24 can be square pipes. The four posts 21 to 24 can be channels (channel steel) or angles (angled steel).

The upper pipe 25 can be made from a transverse portion 31 that extends in a vehicle-width direction; chamfered portions 32, 32 that extend diagonally forward from both ends of this transverse portion 31; and extending portions 33, 33 that extend to a vehicle front from respective tips of these chamfered portions 32, 32. The middle pipe 26 and the lower pipe 27 can be similarly apportioned.

As shown, the chamfered portions 32, 32 are provided between a rear surface of the bed extender 20 and side surfaces of the bed extender 20 on the left and right. As a result, triangular spaces 34, 34 made by connecting the rear surface of the bed extender 20 and the side surfaces of the bed extender 20 on the left and right are formed in the corner portions.

As illustrated in FIG. 3, an elastic band 36 (not seen on a post 24 side) extends from the posts 21, 24, and a lower end of this elastic band 36 is detachably hooked to a band installation portion 37 provided on a tailgate 13 side. A rotation regulation mechanism 50 is provided near this band installation portion 37. Details of this rotation regulation mechanism 50 are described below.

Figure 5:
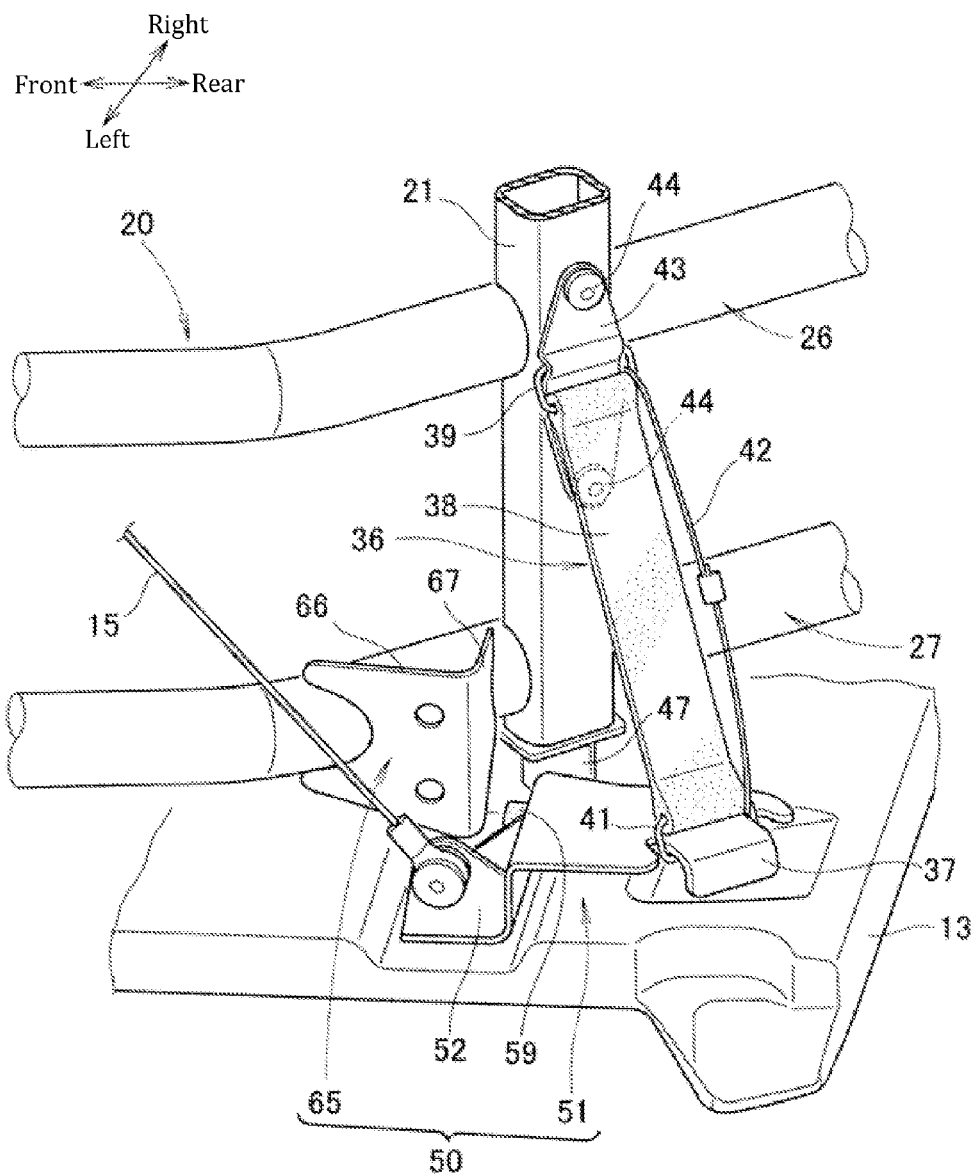
FIG. 5 is a partial enlarged view of FIG. 3.

As illustrated in FIG. 5, the elastic band 36 extends from the post 21. The elastic band 36 includes a band main body 38 made of a elastic material such as rubber; rings 39, 41 connected to upper and lower ends of the band main body 38; and a regulating cord 42 passed through the pair of rings 39, 41. The regulating cord 42 is made of a material of higher tensile strength and lower elasticity than the band main body 38. In some implementations, both the regulating cord 42 and rings 39, 41 may be made of metal. The regulating cord 42 is set to be longer than a free length of the band main body 38 and is tensioned when the band main body 38 stretches to a predetermined distance, thereby regulating further stretching. By this regulation, the band main body 38 does not stretch in excess of a permissible range.

The elastic band 36 has the ring 39 on an upper side fixed to the post 21 using an oval fixing plate 43. The oval fixing plate 43 is fixed to the post 21 with two fasteners 44, 44, one each above and below the metal ring 39. Each fastener 44 may be, for example, a screw or bolt. The oval fixing plate 43 is affixed securely to withstand the pull of the ring 39 away from the post 21.

The rotation regulation mechanism 50 comprises a gate-side stopper member 51 installed on the tailgate 13 side and an extender-side stopper member 65 installed on the bed extender 20 side.

The gate-side stopper member 51 has integrated on a rear portion the band installation portion 37 of a tongue shape that detachably hooks the metal ring 41 on the bottom. Moreover, the gate-side stopper member 51 has integrated on a front portion a wire bracket 52 that locks a lower end of the gate wire 15.

The vibration-dampening cap 47 is on the other end (lower end in this diagram) of the posts 21 to 24 and secures a predetermined space (space D in FIG. 6) against a tensile force of the elastic band 36.

Figure 6:
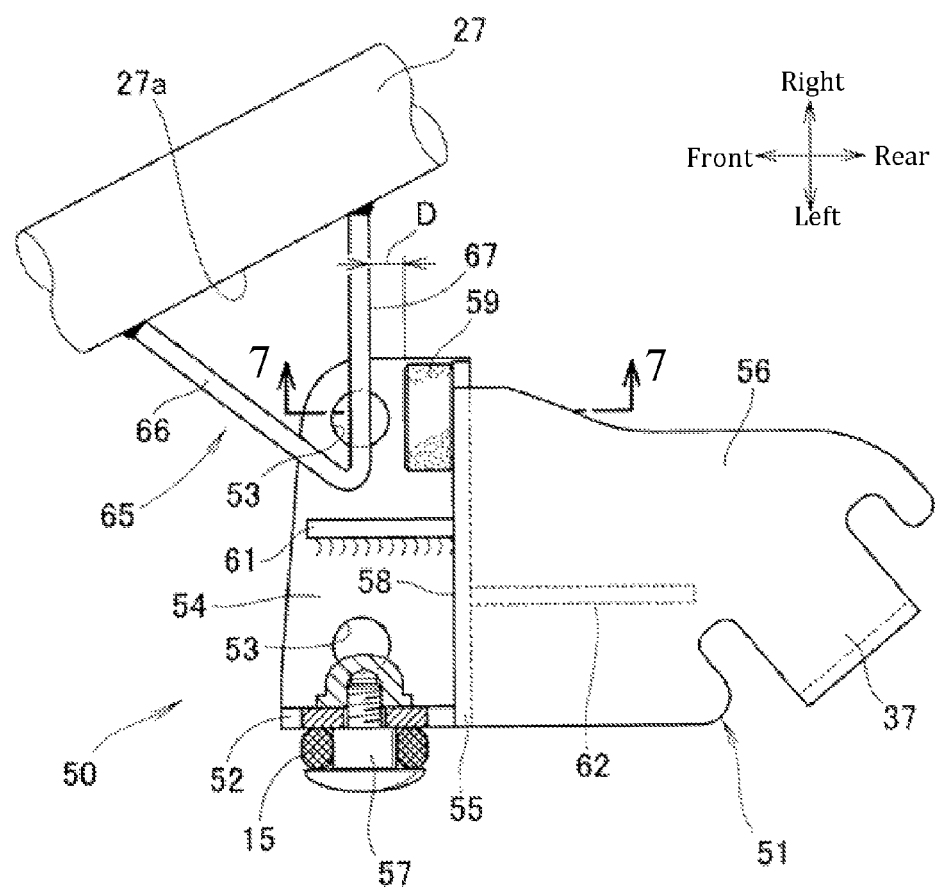
FIG. 6 is a plan view of a gate-side stopper member.

As illustrated in FIG. 6, the gate-side stopper member 51 is made from a base portion 54 that is provided with bolt holes 53, 53 separated in the vehicle-width direction through which bolts that are fixed to the tailgate 13 are passed; the wire bracket 52 that is formed bent upward on a vehicle-width-direction outer side of this base portion 54; a standing wall portion 55 that is raised from the base portion 54; and a main body portion 56 that extends in the rearward direction from an upper end of the standing wall portion 55.

The main body portion 56 is integrally formed with the tongue-shaped band installation portion 37. A lower end portion of the gate wire 15 that supports the tailgate is locked by a bolt 57 to the wire bracket 52.

The surface 58 of the standing wall portion 55 that is facing the front of the vehicle acts as a stopper surface 58. In this example, an elastic member 59 that protrudes further forward is attached to the front-facing stopper surface 58. Because an external force to the vehicle rear is applied to the standing wall portion 55, the standing wall portion 55 is reinforced by bridging a stay 61 between the base portion 54 and the standing wall portion 55 and bridging a stay 62 between the standing wall portion 55 and the main body portion 56. The elastic member 59 may be provided on a rear-facing stopper surface 67.

Furthermore, the extender-side stopper member 65 is connected to a rear surface 27a of the lower pipe 27. This extender-side stopper member 65 is made from a bent plate 66 in an L-shape in a plan view, and a rear surface becomes the rear-facing stopper surface 67. The L-shape may be a V-shape.

The gate-side stopper member 51 and the extender-side stopper member 65 comprising the rotation regulation mechanism 50 of the form described above are disposed in the triangular space 34 illustrated in FIG. 4. The extender-side stopper member 65 is installed on the chamfered portion 32, and the gate-side stopper member 51 is provided in correspondence to a diagonal surface (rear surface 27a) formed in the corner portion.

The rotation regulation mechanism 50 is housed in the triangular space 34, and the rotation regulation mechanism 50 does not protrude sideways from the side surface of the bed extender 20.

Figure 7:
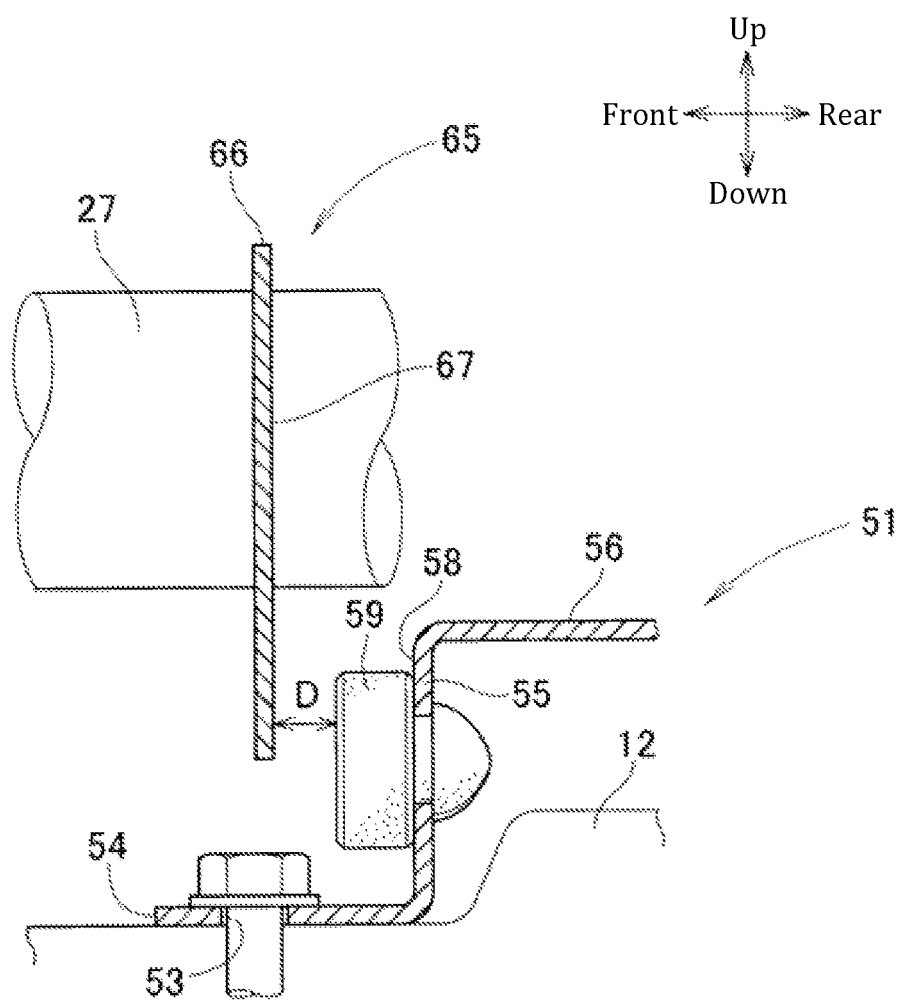
FIG. 7 is a line 7-7 cross-sectional view of FIG. 6.

As illustrated in FIG. 7, the predetermined space D is set between the rear-facing stopper surface 67 and the elastic member 59.

Note that the elastic member 59 may be omitted. If omitted, the predetermined space D is set as between the rear-facing stopper surface 67 and the front-facing stopper surface 58.

Because the predetermined space D is set, a weight of the bed extender 20 is not applied to the gate-side stopper member 51, a rigidity of the gate-side stopper member 51 can be decreased, and reducing a weight of the gate-side stopper member 51 can be easily achieved.

An operation of the rotation regulation mechanism 50 of the present invention is next described.

Figure 8A:
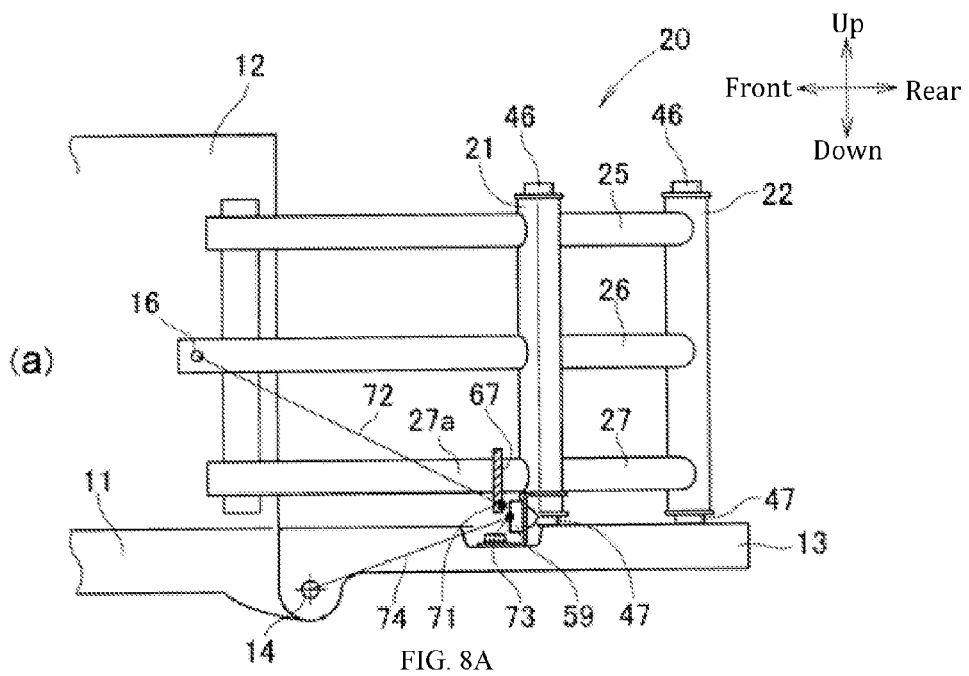
FIGS. 8A-8C are operational views of a rotation regulation mechanism.

As illustrated in FIG. 8A, the tailgate 13 is put in an opened state by being turned around the hinge pin 14. Meanwhile, the bed extender 20 is inverted around the fulcrum portion 16 to rest on the tailgate 13. While omitted in this diagram, the ring 41 of the elastic band 36 is locked to the band installation portion 37.

Note that the extender-side stopper member 65 is provided on the rear surface 27a of a member (the lower pipe 27 in this example) positioned downward in a usage time when the bed extender 20 is inverted relative to the fulcrum portion 16 provided on the side gate 12, that is, below the fulcrum portion 16.

Because of this, a first line 72 that passes through a first point 71 on the rear-facing stopper surface 67 and the fulcrum portion 16 extends downward to the vehicle rear. Moreover, a second line 74 that passes through a second point 73 on the front-facing stopper surface (elastic member 59) and the hinge pin 14 extends upward to the vehicle rear.

Figure 8B:
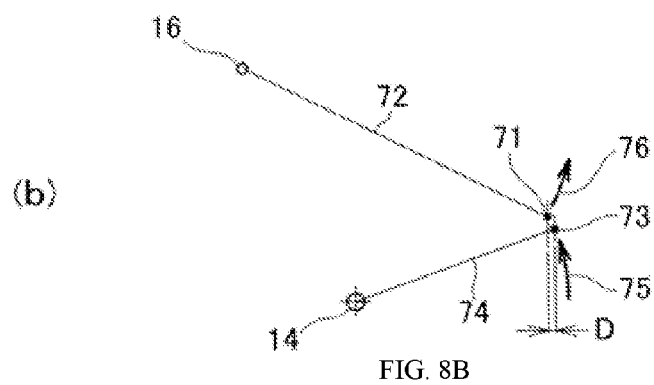

FIG. 8B is a view that excerpts the first and second lines 72, 74 at the usage time (more precisely, a usage commencement time), and the predetermined space D exists between the first point 71 and the second point 73. When travel is commenced, due to an influence from unevenness of a road surface or the like, the vehicle may sway up and down. In conjunction with this swaying, the second point 73 on the tailgate 13 side rises along an arc line 75 around the hinge pin 14. Meanwhile, the first point 71 on the bed-extender 20 side rises along an arc line 76 around the fulcrum portion 16.

Because the second point 73 is above the hinge pin 14, when rising, it moves to the vehicle front. Meanwhile, because the first point 71 is below the fulcrum portion 16, it first moves to the vehicle rear and then starts to move to the vehicle front once it moves above the fulcrum portion 16.

In an initial period of rising, the first point 71 and the second point 73 move so as to approach each other.

Figure 8C:
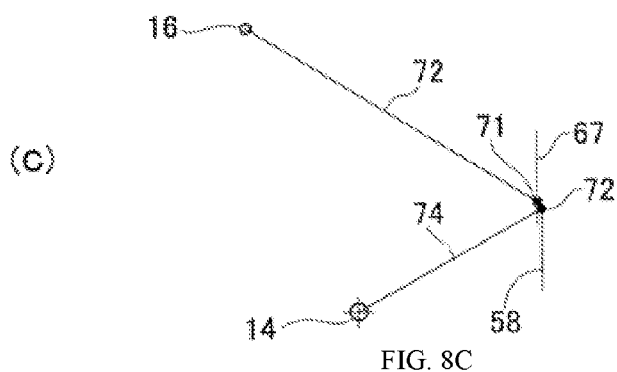

As a result, as illustrated in FIG. 8C, the rear-facing stopper surface 67 and the front-facing stopper surface 58 abut.

When these abut, a triangle is formed whose vertices are the first and second points 71, 73; the fulcrum portion 16; and the hinge pin 14. Because this triangle is structurally rigid, the shape does not change. That is, the first and second points 71, 73 do not rise further, and rotation of the side gate 12 and the bed extender 20 is regulated.

Because rotation is regulated, there is no concern that an excessive force will be applied to the elastic band 36. As a result, the elastic band 36 can be made compact and lightweight.

The present invention is favorable in a vehicle with a load-carrying platform provided with a tailgate that can open and close, such as an MUV or pickup truck.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to explain the principles of the invention and its practical applications, to thereby enable others skilled in the art to best utilize the invention and various embodiments with various modifications as are suited to the particular use contemplated.

What is claimed is:

1. A vehicle with a load-carrying platform, comprising:
    a load-carrying platform that is provided in a vehicle rear portion and has a tailgate that can open and close; and
    a bed extender that has both ends axially supported by a side gate provided to the load-carrying platform, the bed extender being rotatable between a stowed state in contact with the load-carrying platform and an extended state in contact with the tailgate in an open position, the extended state effectively extending a load-carrying space in the vehicle rear portion to include the open tailgate;
    wherein an elastic band is provided so a rear portion of the tailgate and a rear portion of the bed extender enter a tensioned state when the bed extender is in the extended state, a regulating cord is provided that regulates the elastic band from stretching beyond a predetermined distance, and a rotation regulation mechanism is provided to the tailgate and the bed extender that regulates further rotational movement by the tailgate and the bed extender making contact when the tailgate closes.

2. The vehicle with the load-carrying platform according to claim 1,
    wherein the rotation regulation mechanism is made from a gate-side stopper member that is connected to the tailgate and has a front-facing stopper surface and an extender-side stopper member that is connected to the bed extender and has a rear-facing stopper surface, and
    wherein the bed extender is connected to the tailgate and has a predetermined space opened between the front-facing stopper surface and the rear-facing stopper surface.

3. The vehicle with the load-carrying platform according to claim 2, wherein the gate-side stopper member is integrally formed with a wire bracket that holds the tailgate in the open position.

4. The vehicle with the load-carrying platform according to claim 2, wherein the rotation regulation mechanism comprises an elastic member that abuts either the front-facing stopper surface or the rear-facing stopper surface.

5. The vehicle with the load-carrying platform according to claim 4, wherein the gate-side stopper member is further integrally formed with an installation portion of the elastic band.

6. The vehicle with the load-carrying platform according to claim 4, wherein the gate-side stopper member is provided in correspondence to a diagonal surface formed in a corner portion between a rear surface of the bed extender and a side surface of the bed extender on the left or right and is provided on an upper surface of the tailgate.

7. The vehicle with the load-carrying platform according to claim 2, wherein the extender-side stopper member is provided on a rear surface of a member positioned downward when the bed extender is in its extended state.

8. The vehicle with the load-carrying platform according to claim 7, wherein the extender-side stopper member is provided on a chamfered portion formed in a corner portion between a rear surface of the bed extender and a side surface of the bed extender on the left or right.

9. The vehicle with the load-carrying platform according to claim 7, wherein the extender-side stopper member comprises a plate bent in an L-shape.

10. A bed extender system for a vehicle with a load-carrying platform, the bed extender system comprising:
    a bed extender having first and second side portions, each of the first and second side portions including a fulcrum portion such that, when both fulcrum portions are mounted to the vehicle, the bed extender can be inverted by rotating about an axis formed by the fulcrum portions between a stowed state and an extended state;
    an elastic band connected to the bed extender for attaching the bed extender to the vehicle; and
    a regulating cord connected to the bed extender that regulates the elastic band from stretching beyond a predetermined distance.

11. The bed extender system of claim 10, further comprising a rotation regulation mechanism, the rotation regulation mechanism comprising:
    an extender-side stopper member that is connected to the bed extender and has a rear-facing stopper surface,
    an elastic member, and
    a gate-side stopper member having a front-facing stopper surface, the gate-side stopper member configured to mount to a vehicle surface and abut the elastic member, the elastic member further abutting the extender-side stopper member to regulate rotation of the bed extender.

12. The bed extender system of claim 11, wherein the gate-side stopper member is further integrally formed with an installation portion for the elastic band.

13. The bed extender system of claim 11, wherein the extender-side stopper member is provided on a rear surface of a member positioned downward when the bed extender is in its extended state.

14. The bed extender system of claim 13, wherein the extender-side stopper member is provided on a chamfered portion formed in a corner portion between a rear surface of the bed extender and a side surface of the bed extender on the left or right.

15. The bed extender system of claim 13, wherein the extender-side stopper member comprises a plate bent in an L-shape.

16. The bed extender system of claim 11, wherein the gate-side stopper member is integrally formed with a wire bracket for being connected to a tailgate configured to move between a closed position and an open position, and wherein the wire bracket is configured to hold the tailgate in the open position.

17. The bed extender system of claim 16, wherein the rotation regulation mechanism is configured to regulate further rotational movement by the tailgate and the bed extender making contact when the tailgate closes.

18. A rotation regulation mechanism for a bed extender of a vehicle with a load-carrying platform, the rotation regulation mechanism comprising:
   an extender-side stopper member with a rear-facing stopper surface, the extender-side stopper member configured for attachment to the bed extender;
   an elastic member, and
   a gate-side stopper member having a front-facing stopper surface, the gate-side stopper member configured for attachment to a tailgate of the vehicle and to abut the elastic member, the elastic member further abutting the extender-side stopper member to regulate motion of the stopper members, the bed extender and the tailgate.

19. The rotation regulation mechanism of claim 18, wherein the gate-side stopper member is integrally formed with an installation portion configured to receive an elastic band.

20. The rotation regulation mechanism of claim 18, wherein the extender-side stopper member comprises a plate bent in an L-shape.

* * * * *